C. CULMAN.
CHUCK HOLDER.
APPLICATION FILED AUG. 10, 1914.
1,184,671. Patented May 23, 1916.
2 SHEETS—SHEET 1.
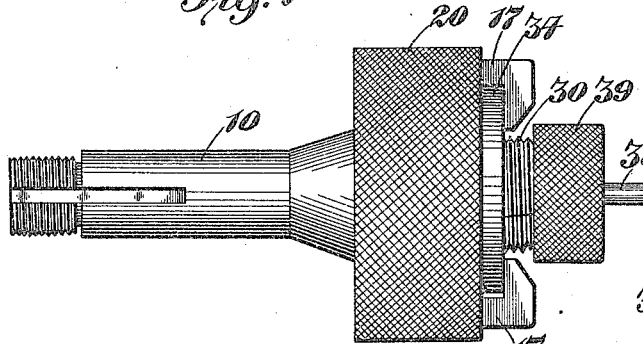
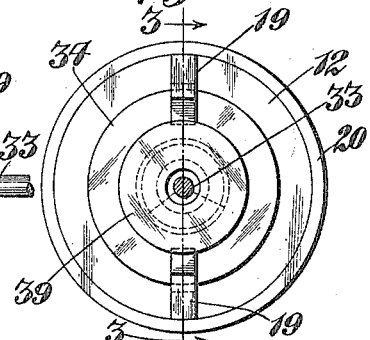
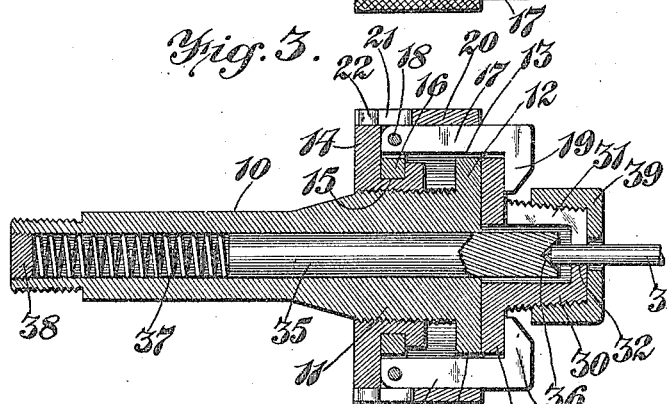
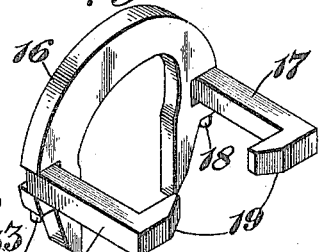
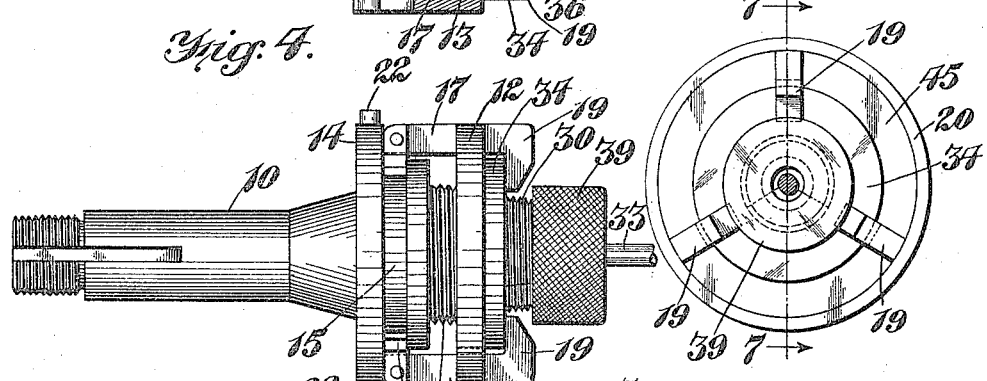
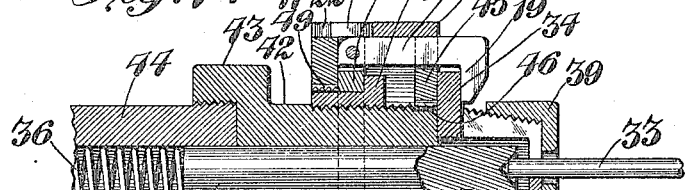
Attest:
Chas. A. Becker,
Arthur B. Cremer.
Inventor.
Carl Culman,
by John H. Bruninga,
His Attorney.

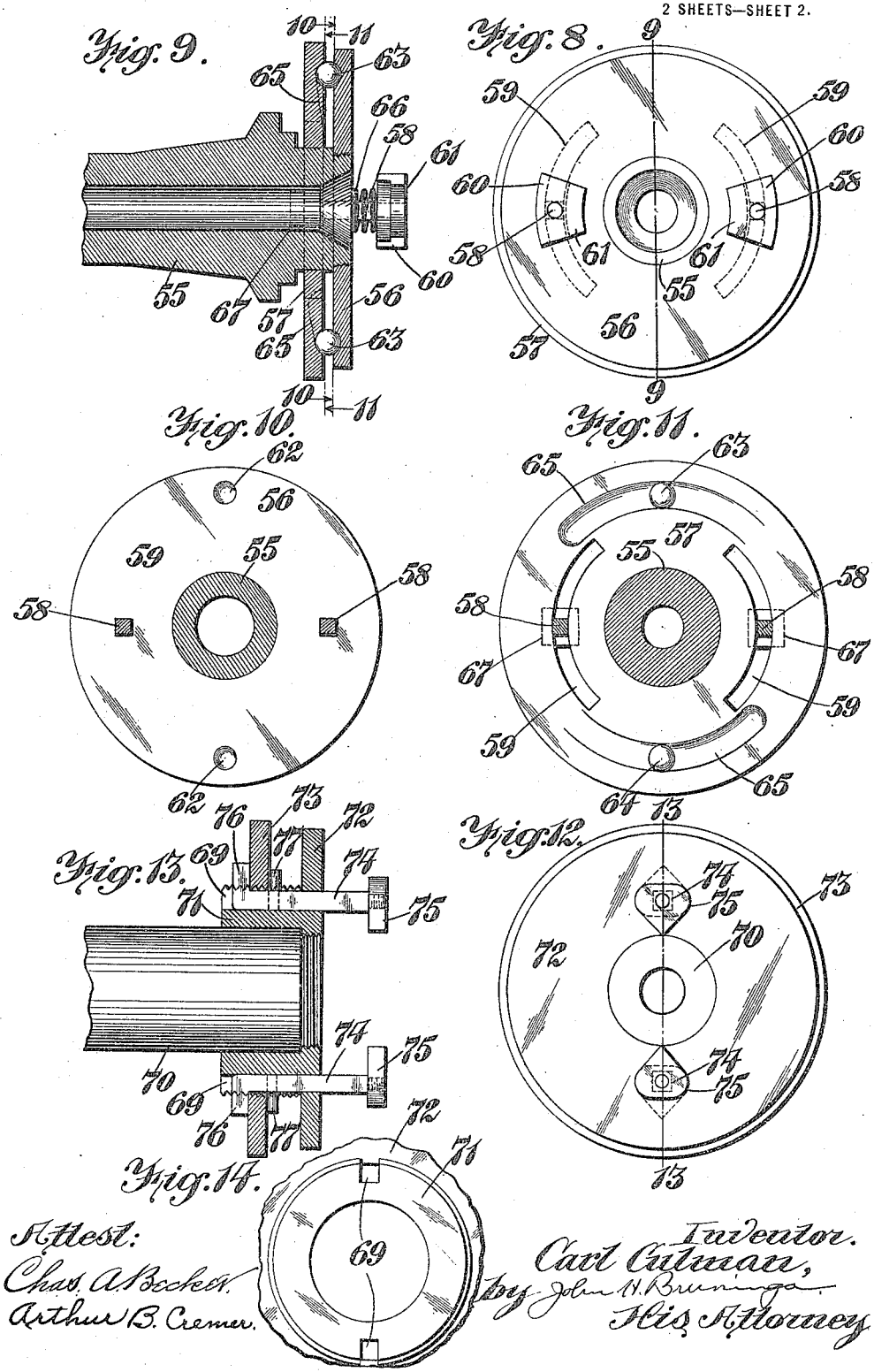

UNITED STATES PATENT OFFICE.

CARL CULMAN, OF MAPLEWOOD, MISSOURI.

CHUCK-HOLDER.

1,184,671.

Specification of Letters Patent.

Patented May 23, 1916.

Application filed August 10, 1914. Serial No. 856,024.

*To all whom it may concern:*

Be it known that I, CARL CULMAN, a citizen of the United States, residing at Maplewood, in the county of St. Louis and State of Missouri, have invented certain new and useful Improvements in Chuck-Holders, of which the following is a specification.

This invention relates to rotary work holding devices, and more particularly, to work holding devices for small tools, such as, watchmakers' lathes.

In turning small work, such as parts of watches, the work is held in a universal chuck centered in the spindle of the lathe. Now, such a universal chuck, as found on the market, is not entirely accurate, but will cause the work to rotate with a slight eccentricity. This is objectionable where the work must be accurate. It is also only possible, with such a chuck, to turn work where the part operated upon is concentric with respect to the part which is gripped by the chuck, and it is not possible to operate on work where the two parts are eccentric with respect to each other. The work gripping chucks, as now used, comprise each a shank adapted to enter the spindle of the lathe, and it is, therefore, necessary to keep in stock a considerable number of these chucks for work of varying sizes.

One of the objects of this invention, therefore, is to construct a work holding device which not alone permits accurate centering of the work, but also has a universal application to different classes of work, whether the parts thereon are concentric or eccentric with respect to each other.

Another object is to construct a chuck holding device which will permit centering of the chuck thereon and of the work gripped by the chuck.

Another object is to construct a device which is simple in construction and operation, cheap to manufacture, and which will require a few and inexpensive parts to be kept in stock.

Further objects will appear from the detail description taken in connection with the accompanying drawings, in which:

Figure 1 is a side elevation of a chuck holder embodying this invention; Fig. 2 is a front elevation; Fig. 3 is a section on the line 3—3, Fig. 2; Fig. 4 is a side elevation of Fig. 1 with the adjusting sleeve removed; Fig. 5 is a detail perspective view; Fig. 6 is a front elevation showing another embodiment of this invention; Fig. 7 is a section on the line 7—7, Fig. 6; Figure 8 is a front elevation showing another embodiment of this invention; Fig. 9 is a section on the line 9—9, Fig. 8; Fig. 10 is a section on the line 10—10, Fig. 9; Fig. 11 is a section on the line 11—11, Fig. 9; Fig. 12 is a front elevation showing still another embodiment of this invention; Fig. 13 is a section on the line 13—13, Fig. 12; and, Fig. 14 is a detail end view of the hub.

Referring to Figs. 1 to 5 inclusive, 10 designates a shank adapted to be inserted into the spindle of an ordinary jeweler's lathe. This shank is provided with a threaded head 11 having a flange 12 forming a face plate, and which is slotted or recessed, as shown at 13. A collar 14 is threaded on the head 11, and has an annular groove 15 adapted to receive a forked carrier 16 which is adapted to be slipped over the collar. The carrier 16 is provided with arms 17 pivoted thereto at 18 and adapted to engage the slots 13 in the flange 12. The arms 17 have jaws 19 which extend radially when the parts are in the positions shown in the drawing. A knurled sleeve 20 slips over the flange 12 and the collar 14, and is provided with slots 21 adapted to engage radial lugs 22 on the collar 14. When the sleeve 20 is removed, the arms 17 can be swung outwardly and can then be removed with the carrier. When the device is assembled, as shown in Figs. 1, 2 and 3, rotation of the sleeve 20 will cause rotation of the collar 14, and will adjust this collar, together with the carrier and the jaws 19 thereon, longitudinally of the shank 10, the arms 17 being guided in the slots 13. The jaws 19 are utilized for holding the chuck in a manner hereinafter to be described.

The chuck may be of any suitable form and, in this particular embodiment, comprises a tapering externally threaded part 30, which is split, as shown at 31, and internally counter-bored to form a series (in this case three) of jaws 32 adapted to open and close to grip the work 33. The jaws are normally retained open by their inherent resiliency, and are closed by a knurled collar 39 threaded thereon. The jaws have formed thereon a flange or disk shaped part 34 adapted to be placed against the face plate 12 and retained thereon by the jaws 19.

In order to center the work, the shank 10 is internally bored to receive a plunger or pump center 35 formed with a conical recess 36 in its forward end, and pressed forwardly by a spring 37 bearing, at one end, against the plunger and, at the other end, against a plug 38.

The operation of this device is as follows: The work 33, which may be a balance staff, or any other suitable piece of work, is clamped in the jaws 30 of the chuck which is placed against the face plate 12 by slipping the flange 34 between the jaws 19. The work, being partially centered by the plunger 35, the chuck is now lightly clamped against the face plate by the clamping sleeve 20. The chuck is now spun in the lathe, and, by holding a tool against the work 33, this work will be automatically centered due to the fact that the chuck is only lightly clamped. After the work has been centered, the clamping sleeve 20 is turned up to tightly clamp the chuck on the face plate.

Referring, now, to Figs. 6 and 7, a chuck holding device is here screwed directly onto the spindle of the lathe. In this construction, the shank 42 is provided with a head 43 which is internally threaded to screw onto the spindle 44 of the lathe. The shank 42 is threaded to receive the face plate 45, which is locked in position by a pin 46, or in any other suitable manner. The collar 47 is threaded on the shank 42 and has a flange 48 threaded thereon and locked in position by a pin 49 to form an annular recess for the jaw carrier 50. This jaw carrier is, in this case, in the form of an annular ring, and has pivoted thereto the arms 17, which arms, together with the other parts of the device, are of the same construction as shown in Figs. 1 to 5 inclusive, and are designated by the same reference characters. The operation of this device is substantially the same as in the construction shown in Figs. 1 to 5 inclusive.

Referring, now, to Figs. 8 to 11 inclusive, 55 designates the spindle of the lathe, which has mounted thereon a face plate 56. A knurled disk 57 is mounted on the spindle 55 so as to rotate and slide thereon. Angular shanks 58 pass through and are guided in square holes in the face plate 56, and pass through slots 59 in the knurled disk 57, these shanks being provided with heads 67 in the rear of the knurled disk. These shanks have threaded thereon jaws 60, which are undercut to form inwardly projecting lips 61. The face plate 56 is provided with depressions 62 adapted to receive balls 63, while the knurled disk 57 has cam recesses 65 of increasing depth to engage the balls. The shanks 58 are preferably provided with light springs to normally hold the face plate and the disk together. The operation of this device will be obvious. When the knurled disk 57 is turned on the spindle 55, the jaws 60 will be moved toward and from the face plate, and these jaws can, therefore, be utilized to clamp a chuck to the face plate in the same manner as in the other embodiments. The jaws 60 may be turned outwardly, so that the lips 61 will face outwardly, for clamping certain classes of work. This can be accomplished by turning them through one hundred eighty degrees (180°).

Referring, now, to Figs. 12, 13 and 14, 70 designates a lathe spindle which has screwed thereon a hub 71 provided with an integral face plate 72. The hub 71 is externally threaded to receive a knurled adjusting disk or collar 73. The hub 71 is slotted, as shown at 69, to receive the shanks 74, of square section, which carry the jaws 75. The shanks 74 are each provided with a lug 76, engaging one side of the collar 73, and with a pin 77 tapped into the shank, and engaging the other side of the collar 73. It will be obvious that adjustment of the collar 73 will cause an adjustment of the jaws 75 toward and from the face plate. The jaws 75 can be swung through one hundred eighty degrees (180°), as shown in dotted lines, Fig. 12, on account of being threaded onto the shanks 74. The operation is the same as the devices heretofore described.

The work holding device is simple in construction and operation, and has a universal application. The chuck, and the work gripped thereby, is self-centered, and this centering of the work is obtained with greater accuracy than can be obtained with the universal chuck. The part of the work to be operated upon is centered, whether this part is concentric or eccentric with respect to the part gripped by the chuck. The pump center operates not only to center the work in the chuck holder, but acts also as an end bearing for holding the end of the work. The chuck can be removed and replaced with great facility, and different sizes of work can, therefore, be changed with greater rapidity than in accordance with the old method, where the entire chuck must be removed from and replaced in the spindle. A series of chucks can be provided for varying sizes of work, each chuck taking different diameters of work, within certain limits. The equipment required is, therefore, not as expensive and requires less space and material than in accordance with the old method, since a full equipment requires only a single chuck holder and a series of chucks.

It is obvious that various changes may be made in details of construction within the scope of the appended claims without departing from the spirit of this invention, and it is, therefore, to be understood that this invention is not to be limited to the specific construction shown and described.

Having thus described the invention, what is claimed is:

1. A rotary chuck holding device, comprising a part adapted for engagement with a lathe and having a face plate, a chuck provided with means for holding the work therein, said chuck being adjustable over the face plate to center the work with respect to the lathe spindle, a plurality of axially movable jaws adapted to engage the chuck at relatively distinct points, and means for operating said jaws in unison to clamp the chuck, when adjusted, to the face plate.

2. A rotary chuck holding device, comprising a part adapted for engagement with a lathe and having a face plate, a chuck provided with work holding means, said chuck being adjustable over the face plate to center the work with respect to the lathe spindle, a plurality of axially movable jaws having hooked outer ends to engage the chuck at relatively distinct points, and means for operating said jaws in unison to clamp the chuck, when adjusted, to the face plate.

3. A rotary chuck holding device, comprising a part adapted for engagement with a lathe and having a face plate, a chuck provided with work holding means and having a flange adapted to bear on the face plate, said chuck being adjustable over the face plate to center the work with respect to the lathe spindle, a plurality of axially movable jaws having hooked outer ends to engage said flange at relatively distinct points, and means for operating said jaws in unison to clamp the chuck, when adjusted to the face plate.

4. A rotary chuck holding device, comprising a part adapted for attachment to a lathe and having a face plate, a work gripping chuck adjustable on said plate to center the work with respect to the lathe spindle, means arranged axially of said face plate and operating by engagement with the work for automatically adjusting said chuck on said face plate, a plurality of axially movable jaws adapted to adjustably clamp said chuck to said face plate, and means for operating said jaws in unison, constructed to permit adjusting and clamping of said chuck on said face plate.

5. A rotary chuck holder, comprising a part adapted for attachment to a lathe and having a face plate, a plurality of distinct jaws mounted to move axially of said face plate and adapted to clamp a work holding chuck to said face plate, and means for operating said jaws in unison, constructed to permit adjustment of the chuck to center the work on said face plate.

6. A rotary chuck holder, comprising a shank adapted for attachment to a lathe and having a face plate, a plurality of distinct jaws mounted to move axially of said face plate and adapted to clamp a work holding chuck to said face plate, and a rotary member mounted on said shank for operating said jaws in unison, constructed to permit adjustment of the chuck to center the work on said face plate.

7. A rotary chuck holder, comprising a shank adapted for attachment to a lathe and having a face plate, a plurality of distinct jaws mounted to move axially of said face plate and adapted to clamp a work holding chuck to said face plate, and a rotary collar threaded on said shank for operating said jaws in unison, constructed to permit adjustment of the chuck to center the work on said face plate.

8. A rotary chuck holder, comprising a shank adapted for attachment to a lathe and having a face plate, a collar threaded on said shank, and a plurality of distinct axially movable jaws pivoted on said collar and projecting beyond said face plate, adapted to clamp a work holding chuck to said face plate, said parts being constructed to permit adjustment of the chuck to center the work on said face plate.

9. A rotary chuck holder, comprising a shank adapted for attachment to a lathe and having a face plate, a collar threaded on said shank, and a plurality of distinct axially movable hooked jaws pivoted on said collar and projecting beyond said face plate, said jaws being adapted to clamp a work holding chuck to said face plate and to permit adjustment of said chuck over the face plate for centering the work.

10. A rotary chuck holder, comprising a shank adapted for attachment to a lathe and having a face plate, a collar threaded on said shank, a carrier removably mounted on said collar, and a plurality of distinct axially movable jaws pivoted on said carrier and projecting beyond said face plate, said jaws being adapted to clamp a work holding chuck to said face plate and permit adjustment of said chuck over the face plate to center the work.

11. A rotary chuck holder, comprising a shank adapted for attachment to a lathe and having a face plate, a collar threaded on said shank, a plurality of distinct jaws movably mounted on said collar and projecting beyond said face plate, said jaws being adapted to clamp a work holding chuck to said face plate and permit adjustment of said chuck over the face plate to center the work, and a sleeve connected with said collar and adapted to retain said jaws in chuck engaging position.

12. A rotary chuck holder, comprising a part adapted for attachment to a lathe and having a face plate, a work holding chuck adjustable thereover to center the work with respect to the lathe spindle, a plurality of distinct axially movable jaws associated with said face plate and adapted to adjustably clamp the chuck thereto, and means for operating said jaws in unison, adapted to retain said jaws in chuck engaging position.

In testimony whereof I affix my signature in the presence of these two witnesses.

CARL CULMAN.

Witnesses:
J. H. BRUNINGA,
DOUGLAS H. JONES.

Copies of this patent may be obtained for five cents each, by addressing the "Commissioner of Patents, Washington, D. C."